United States Patent [19]
Barnes, Jr. et al.

[11] 3,921,457
[45] Nov. 25, 1975

[54] SYSTEM FOR MONITORING THE ATMOSPHERE IN PETROLEUM PRODUCT TANKS

[75] Inventors: Vernon M. Barnes, Jr.; Kenneth M. Gunn; Carlton M. Slough, all of Richmond, Va.

[73] Assignee: Texaco Inc., New York, N.Y.

[22] Filed: Nov. 1, 1974

[21] Appl. No.: 519,900

[52] U.S. Cl............................................. 73/421.5 R
[51] Int. Cl.²............................................ G01N 1/26
[58] Field of Search .................... 73/421 B, 421.5 R

[56] References Cited
UNITED STATES PATENTS

| | | | |
|---|---|---|---|
| 3,121,334 | 2/1964 | Bott................................. | 73/421 B |
| 3,357,257 | 12/1967 | Herndon et al................ | 73/421.5 R |
| 3,736,792 | 6/1973 | Poulsen........................ | 73/421.5 R |

FOREIGN PATENTS OR APPLICATIONS 1,169,851    1964    Germany.......................... 73/421 B Primary Examiner—S. Clement Swisher
Attorney, Agent, or Firm—Thomas H. Whaley; Carl G. Ries; Henry C. Dearborn

[57] ABSTRACT

A portable system for sampling gas from plural levels inside of petroleum product tanks. It includes flexible tubes attached to a reel, for portability, and couplers for connecting the tubes to a console. The console includes couplers for connecting a gas detector to determine dangerous conditions, and it includes an aspirator for creating suction to draw the gas samples.

6 Claims, 1 Drawing Figure

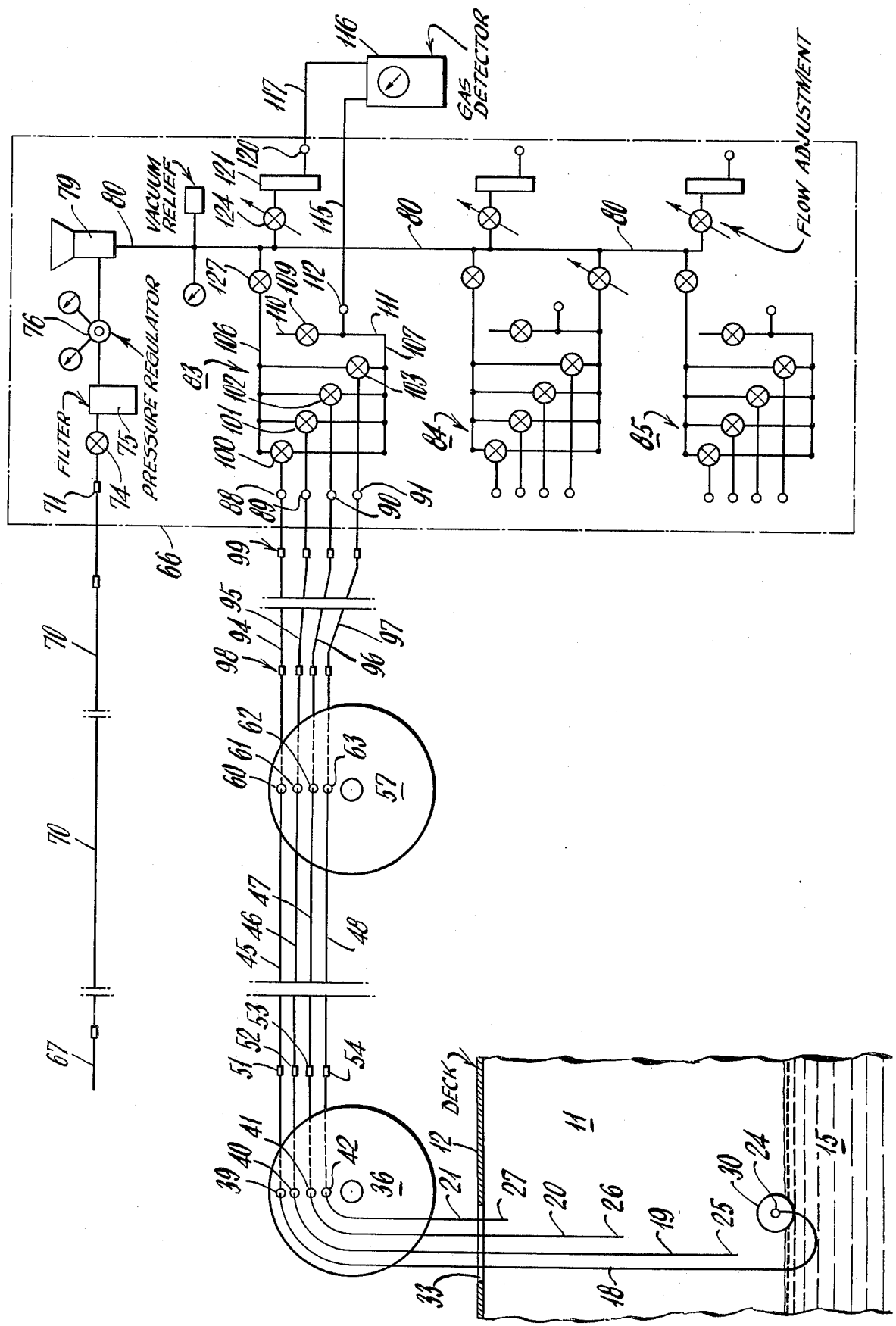

SYSTEM FOR MONITORING THE ATMOSPHERE IN PETROLEUM PRODUCT TANKS

BACKGROUND OF THE INVENTION

1. Field of the Invention

This invention concerns an atmosphere-sampling system in general. More particularly, such system is applicable to tanks containing petroleum products, and especially such tanks aboard ships, i.e., petroleum tankers. It is especially concerned with a portable system for making periodic measurements of the gas atmosphere at different levels in one or more of the product tanks of a tanker.

2. Description of the Prior Art

It has been found that particularly in connection with the large-sized tank ships now being constructed, there is a danger of developing explosive atmospheres in the empty sapce of cargo tanks. Consequently, there is a need to provide for monitoring the atmospheres within such tanks in order to determine when dangerous conditions exist. Such monitoring is especially needed in connection with tank-washing operations, which is when the explosive atmosphere is most likely to be generated.

Thus, it is an object of this invention to provide a system which may be easily transported about the deck of a tanker so that it may be set up for measuring the atmospheric conditions within a given tank. In particular, it provides for bringing continuous gas samples from various levels in a cargo tank so that gas concentration may be monitored through the entire time when the system is in place.

SUMMARY OF THE INVENTION

Briefly, this invention concerns a system for monitoring the atmopshere in petroleum product tanks. It comprises in combination a plurality of flexible tubes having open ends, and means for supporting said tubes with said open ends at different levels in the atmosphere inside of a tank. It also comprises means for applying a reduced pressure to the other ends of said tubes for drawing samples of said atmosphere into said open ends, and means for connecting a gas detector in series with said tubes and said reduced pressure means, for detecting undesirable conditions of said samples.

Again, briefly, the invention concerns a portable system for monitoring the atmosphere in petroleum product tanks. It comprises in combination a gas-sampling console, and a first plurality of flexible tubes having open ends and being mounted on a reel. Said tubes have different lengths for sampling said atmosphere at different levels in a tank. The said longest tube has a float means associated therewith to keep said open ends above the surface of said product. The other ends of said tubes are mounted on said reel with coupling means for extending the tube passages. The combination also comprises a second plurality of flexible tubes which are mounted on a second reel with coupling means at both ends thereof for connecting said first tubes other ends to said console. The said console comprises a plurality of separate gas-sampling stations, one for each tank's atmosphere to be sampled. Each of said stations has a plurality of coupling means corresponding with said flexible tubes, a corresponding plurality of selector valves, and means for coupling a gas detector to a selected one or more of said flexible tubes. The console also comprises an aspirator for applying suction to move said gas samples through said detector.

BRIEF DESCRIPTION OF THE DRAWING

The foregoing and other objects and benefits of the invention will be more fully set forth below in connection with the best mode contemplated by the inventors of carrying out the invention, and in connection with which there is an illustration provided in the drawing, wherein:

The FIGURE of the drawing is a schematic diagram illustrating a system according to the invention.

DESCRIPTION OF THE PREFERRED EMBODIMENT

In order to be able to continuously withdraw samples of the atmosphere within a product tank on a tanker over a predetermined period of time, there has been developed a portable system that is especially valuable for use aboard tank ships. It will be observed that the various elements of the system according to this invention are disclosed in relation to the entire system without requiring any special physical structure. Thus, it will be clear to anyone skilled in the art that the various elements of the system may take different physical forms while still accomplishing the cooperative functions of the entire system.

It has been found that tank-washing operations created explosive conditions aboard tankers so that it is important to monitor gas concentrations before and during such washing. Because of the manner in which such washing operations are carried out, it is necessary to check a series of locations rapidly to determine when gas removal has progressed to the point that preparations for washing may be begun. Also, it is necessary to make continuous surveillance of several fixed locations during actual washing.

With reference to the drawing FIGURE, it will be observed that the system includes elements (all schematically illustrated) that are particularly combined for use on tank ships. Consequently, there is shown a tank 11 that has a closed top formed by a deck 12 of a ship (not shown) of which the tank 11 is a part. The tank 11 contains a liquid petroleum product 15 above which there is a gaseous atmosphere.

In order to monitor the gas in the manner indicated above, the system of this invention includes a plurality, e.g., four flexible tubes 18, 19, 20, and 21. These are schematically illustrated using single-line showings, and it is to be understood that various types of flexible tubes might be employed. It has been found that a preferable type is one constructed of a soft polyurethane formulation. Such material has the superior strength and ability to withstand collapse under vacuum; it also has less tendency to absorb the gas being sampled.

The flexible tubes 18–21 have open ends 24, 25, 26, and 27, respectively. The tubes 18–21 are staggered in length relative to one another, so that the open ends 24-27 will be located in tank 11 at each of a plurality of different levels. The lowermost of the open ends, i.e., end 24, has associated therewith a float 30 that is designed to maintain this open end 24 above the surface of the product 15. The other open ends 25, 26, 27 are maintained at the predetermined relative positions within the atmosphere of the tank 11, in any feasible manner. For example, the tubes 18–21 may be taped or otherwise fastened together to form a bundle (not shown).

It will be noted that the flexible tubes 18–21 are lowered into the atmosphere of tank 11 through a hole, or opening 33 in the deck 12. In ship terminology such an opening is known as a "Butterworth" hole.

For portability of the bundle of flexible tubes 18–21, there is a reel 36 on which the bundle of tubes may be wound. This may be described as a sounding reel. The other ends of the tubes 18–21 are terminated at four couplings 39, 40, 41, and 42, respectively. These couplings 39-42 are mounted on a flange of the reel 36 in order to make them accessible whether or not the bundle of tubes is fully unreeled. The couplings are preferably screw-type fittings with knurled nuts (not shown) that can be made up finger-tight.

The complimentary portions of the couplings 39–42 are carried by the free ends of a second group of flexible tubes 45–48. It will be understood that these free ends of the tubes 45–48 have couplers 51–54 as fittings thereon, and they are complimentary to the other couplings 39–42 so as to make gas-tight couplings therewith. This is indicated by the dashed lines on the drawing that connect the couplings 39–42 with the corresponding couplings 51–54, respectively.

The second set of flexible tubes 45–48 are also mounted for winding onto another reel 57 which, in turn, has mounted on the outside of one of its flanges a similar group of coupling means 60–63. This reel 57 may be described as an extension reel.

The arrangement permits taking samples from different levels within the tank 11 and delivering such samples through the flexible tubes to a convenient location on the deck of the ship where a portable console 66 is located. It will be noted that the console 66 is only schematically indicated by a dashed-line box. The physical structure may, of course, take numerous different forms.

While various sources of reduced pressure might be employed for drawing the samples into the tubes through the open ends 24–27, a preferable arrangement is to locate the console 66 adjacent to an outlet 67 of the ship's compressed-air supply. The compressed air is used to drive an aspirator for obtaining a reduced pressure, as will be explained hereafter. If necessary, an extension tube 70 may be coupled to the "ship's air" outlet 67, and the extension 70 is then connected to a coupling 71 located on the console 66.

In the foregoing manner, the compressed-air supply will be connected to the console 66, where it will go via a valve 74 and a filter 75 to a pressure regulator 76. The output of the regulator is connected to the input of an aspirator 79, where a reduced pressure is developed in a conventional manner. The reduced pressure is connected via a low-pressure manifold 80 to each of a plurality of gas sampling stations 83, 84, and 85, on the console 66.

While there are three stations 83, 84, and 85 illustrated, it will be understood that they are substantially the same, and a description of station 83 will suffice to explain them all. Also, it will be appreciated that the number of stations may be increased or reduced, depending upon the capabilities of the system as well the feasibility of employing a number of stations at the same time.

The station 83 includes four inlet-coupling means 88–91 to which the flexible tubes 45–48 may be connected. This would be done via a group of short jumper tubes 94–97. The connections at the ends of these jumper tubes employ complimentary fittings or couplers 98 and 99 which may be attached to the respective couplings means 60–63 and 88–91, as is indicated by the dashed lines of the drawing.

The station 83 also includes a group of selector valves 100–103 which alternatively connect each of the tubes (connected at coupling means 88–91) to a bypass manifold 106 or another short manifold 107. The manifold 107 includes a tube 111 which is connected to a coupling 112 and to a valve 109. The coupling 112 is adapted to have a tube 115 connected to it so that the gas flow will be directed to the input of a gas detector 116. The output of the gas detector 116 goes via another tube 117 that is connected to a coupling 120 located on the console 66. Then the gas flow will continue through a flow meter 121 on the console which has its output connected to an adjustable valve 124 for flow control. The other side of the valve 124 is connected to the main low-pressure manifold 80.

The valve 109 is kept closed during sampling of the atmosphere in tank 11 and monitoring of such sampling by the gas detector 116. It is only opened to admit air via a bleed line 110 if it is desired to calibrate the detector 116.

It will be understood that the gas detector 116 which is employed may be any satisfactory measuring instrument for determining the characteristics of interest of the gas flow being measured. In the particular application of the invention being described, detectors with scales to indicate percentage of combustible gas in different degrees of sensitivity, have been employed. Also, some instruments have a scale to indicate the "lower explosive limit". Of course, both indications are employed in order to discover dangerous conditions in the atmosphere of the tank being monitored.

It will also be noted that with the system according to this invention, the monitoring of gas at different levels within a given tank may be carried out by connecting individual ones of the flexible tubes to the gas detector one at a time, or if desired, they may be sampled in pairs, or even all together, by manipulating the valves 100–103. The one or more of these valves that are switched to have the corresponding tank level at open ends 24–27 monitored, will connect these samples to the detector 116 via the manifold 107, while the remaining ones will leave their corresponding open ends connected to the bypass manifold 106. A valve 127 will be open to have these bypassed samples continually drawn so that they can be monitored with a minimum of time delay.

It will be appreciated that, if desired, a monitoring procedure might involve switching all of the valves 100-103 to connect the flow of all four samples through the detector 116 until an undesirable condition is indicated. After that, the particular level of sampling where such conditions exist, may be determined.

It will also be understood that the other stations 84 and 85 may be similarly connected to other tanks so that the atmosphere therein may have samples continuously drawin through the system. These would then be ready for monitoring with minimum time delay.

While one embodiment of the invention has been described above in considerable detail in accordance with the applicable statutes, this is not to be taken as in any way limiting the invention, but merely as being descriptive thereof.

We claim:

1. A system for monitoring the atmosphere in petroleum product tanks, comprising in combination a plurality of flexible tubes having open ends, means for supporting said tubes with said open ends at different levels in the atmosphere inside a tank, means for applying a reduced pressure to the other ends of said tubes for drawing samples of said atmosphere into said open ends, and means for connecting a gas detector in series with one or more of said tubes and said reduced pressure means for detecting undesirable conditions of said samples.

2. A system for monitoring the atmosphere in petroleum product tanks according to claim 1, wherein said supporting means comprises float means associated with the lowermost of said open ends to keep it above the surface of said product.

3. A system for monitoring the atmosphere in petroleum product tanks according to claim 2, wherein said supporting means also comprises reel means for winding said flexible tubes to permit lowering said open ends into said tank when monitoring, and to make said tubes portable when wound up.

4. A system for monitoring the atmosphere in petroleum product tanks according to claim 3, further comprising a second plurality of flexible tubes, and means for connecting said second tubes in series between said first tubes and said gas-detector connecting means.

5. A portable system for monitoring the atmosphere in petroleum product tanks, comprising in combination a gas-sampling console, a first plurality of flexible tubes having open ends and being mounted on a reel, said tubes having different lengths for sampling said atmosphere at different levels in a tank, said longest tube having float means associated therewith to keep said open end above the surface of said product, the other ends of said tubes being mounted in said reel with coupling means for extending the tube passages, a second plurality of flexible tubes being mounted on a second reel with coupling means at both ends for connecting said first tubes other ends to said console, said console comprising a plurality of separate gas-sampling stations one for each tank atmosphere to be sampled, each of said stations having a plurality of coupling means corresponding with said flexible tubes, a corresponding plurality of selector valves, and means for coupling a gas detector to a selected one or more of said flexible tubes, and an aspirator for applying suction to move said gas samples through said detector.

6. A portable system for monitoring the atmosphere in petroleum product tanks in accordance with claim 5, wherein each of said stations also has means for connecting an air bleed line to the input of said detector.

* * * * *